(12) United States Patent
Murray et al.

(10) Patent No.: US 6,190,301 B1
(45) Date of Patent: Feb. 20, 2001

(54) EMBEDDING OF SOLID CARBON DIOXIDE IN SEA FLOOR SEDIMENT

(75) Inventors: Charles Nicholas Murray; Peter Michael Schlittenhardt, both of Ispra (IT)

(73) Assignee: European Atomic Energy Community (Euratom), Commission of the European Communities, Plateau du Kirchberg (LU)

( * ) Notice: Under 35 U.S.C. 154(b), the term of this patent shall be extended for 0 days.

(21) Appl. No.: 08/687,452

(22) PCT Filed: Feb. 14, 1995

(86) PCT No.: PCT/EP95/00536

§ 371 Date: Oct. 16, 1996

§ 102(e) Date: Oct. 16, 1996

(87) PCT Pub. No.: WO95/22416

PCT Pub. Date: Aug. 24, 1995

(30) Foreign Application Priority Data

Feb. 17, 1994 (GB) .................................................. 9403037

(51) Int. Cl.[7] ...................................................... B08B 1/00
(52) U.S. Cl. ........................................... 588/250; 405/128
(58) Field of Search ..................................... 405/128, 129; 588/250, 259; 62/53.1

(56) References Cited

U.S. PATENT DOCUMENTS

| | | | | |
|---|---|---|---|---|
| 3,110,557 | * | 11/1963 | Spector | 405/128 X |
| 4,877,353 | * | 10/1989 | Wisotsky | 405/128 |
| 5,245,118 | * | 9/1993 | Cole | 588/250 |
| 5,293,751 | * | 3/1994 | Asai | 588/250 X |
| 5,562,891 | * | 10/1996 | Spencer et al. | 588/250 X |
| 5,733,066 | * | 3/1998 | Myers | 588/250 X |

FOREIGN PATENT DOCUMENTS

| | | | |
|---|---|---|---|
| 2742340 | * | 3/1979 | (DE) ..................................... 405/128 |
| 0408979 | * | 1/1991 | (EP) ..................................... 405/128 |
| 000463663 | * | 1/1992 | (EP) ..................................... 588/250 |
| 2034509 | * | 6/1980 | (GB) ..................................... 405/128 |
| 0023872 | * | 2/1977 | (JP) ..................................... 405/128 |
| 404029738 | * | 1/1992 | (JP) ..................................... 588/250 |
| 94/03288 | | 2/1994 | (WO) . |

OTHER PUBLICATIONS

PTO 2000–3886 Translation of Japanese Published Unexamined Patent Application 4–29738; published Jan. 1992; translation Sep. 2000.*

* cited by examiner

Primary Examiner—Eileen D. Lillis
Assistant Examiner—John Kreck
(74) Attorney, Agent, or Firm—Bacon & Thomas

(57) ABSTRACT

The invention relates to a process and vehicle for the disposal of carbon dioxide. Gaseous carbon dioxide is solidified and allowed to free fall through open water where i at least partially embeds itself in sedimentary formations. Sedimentation ensures that the marine environment is an overall carbon sink through carbonate sequestration.

11 Claims, 10 Drawing Sheets

- PENETRATOR GEOMETRY: L/D = 10
- SOFT SEDIMENT, SHEAR STRENGTH OF 5 + 1.2z
- FULLY TURBULENT FLOW, SMOOTH SURFACE

EMBEDDING OF SOLID CARBON DIOXIDE IN SEA FLOOR SEDIMENT

The present invention relates to a process and vehicle for the disposal of gaseous carbon dioxide. Gaseous carbon dioxide is a naturally produced gas which is present in the atmosphere; it is also a biproduct of industrial activity (anthropogenic carbon dioxide). The process comprises solidifying atmospheric carbon dioxide and, at least partially, embedding the solid carbon dioxide in open water floor sediment. The vehicle comprises solidified atmospheric carbon dioxide in a form which when allowed to free fall through open water at least partially embeds itself in deep geological sedimentary formations.

Carbon dioxide is considered to be one of the principal greenhouse gases contributing to global warming. A number of solutions have recently been proposed for the separation of carbon dioxide from the atmosphere in order to counterbalance the increasing atmospheric concentrations of carbon dioxide: Orr.J.C., Nature, Vol.357,283–284 (1992), Nakicenovic, N. & John, A., Energy Vol. 16,No.11/12, 1347–1377 (1991), De Baar, H. J. W., Energy Convers. Mgmt. Vol.33, NO.5–8, 635–642 (1992) and Wilson, T. R. S., Energy Convers. Mgmt. Vol.33, No.5–8, 627–633 1992).

Use of the deep oceans has been proposed as a possible suitable disposal medium for excess atmospheric carbon dioxide, [Marchetti, C., Climate Change 1, 59–68 (1977)]. Investigations have underlined the need to dispose of carbon dioxide at great depths in oceans, for example depths greater than 3 km and to use sinking currents to avoid rapid release of the carbon dioxide to the atmosphere [Herzog, H., Golomb, D. & Zemba, S. Env.Prog. 10, 64–74 (1991)), and Bacastow, R. & Stegen, G. R. in Proc. Oceans '91 Vol.3, 1654–1657 [IEEE, Honolulu, Hawaii, (1991)].

More recent investigations have indicated that even shallow injection of carbon dioxide could be envisaged by relying on the increase in water density that would result from carbon dioxide dissolution in seawater to transport the dissolved gas to greater depths [Haugen, P. M. & Drange, H., Nature, Vol.357,318–320 (1992)]. It has been proposed that if carbon dioxide is injected near the shore (at depths in the range of 200–400 m), gravity currents may carry the dense carbon dioxide laden waters along the bottom slope towards deep water. Both the disposal scenarios described above depend on the injection of carbon dioxide at the required depth, either directly into the sea as a liquid-gas mixture, or by pumping artificially enriched seawater containing the carbon dioxide at elevated pressures. It has been argued that shallow injection of carbon dioxide in coastal regions is less expensive in terms of energy and capital costs than deep-ocean disposal [Haugen, P. M. & Drange, H. Nature, Vol.357, 318–320 (1992)].

The choice of the marine environment as a disposal medium for carbon dioxide is based on the observation that ocean waters and sediments play an important role in the global carbon cycle and are known to be major sinks and sources of natural carbon. Sedimentation ensures that the marine environment is an overall carbon sink through carbonate sequestration. Although seawater itself contains large quantities of carbon dioxide as carbonate and bicarbonate ions and as dissolved carbon dioxide gas, the system is in dynamic exchange with atmospheric carbon dioxide and depending on temperature and salinity the marine environment can act as a sink or a source for this gas.

This reasoning makes the disposal of carbon dioxide by dissolution in either shallow or deep waters uncertain, irrespective of potential biological impact, economics or social acceptability. Although the capacity of ocean waters to dilute and dissolve carbon dioxide is very large and natural processes will tend to sequester it as sedimentary material over long time scales due to geological processes (millions of years), changes in physical and biological oceanographic processes such as deep water formation or primary production may be capable of releasing it to the atmosphere very rapidly (decades to hundreds of years). The techniques proposed so far will thus only tend to displace the problem into the relatively near future without ensuring a permanent and/or long-term disposal solution [Hoffert, M. L., Wey, Y -C., Callegari, A. J., Broecker W. S., Climate Change, 2, 53–68 (1979)].

Deep ocean areas such as trenches (at depths greater than 6–8 km) and abyssal plains (at depths greater than 3–5 km) are among the most inaccessible on Earth and are unlikely to be disrupted even by potential rapid climatic changes. Deep sea pelagic sediments are quantitatively made up of two main types of sediments: deep-sea clays and carbonates. The former consist predominantly of fine grained land derived (lithogenous) particles which have been deposited at slow rates (less than 10 mm per 1000 years), but may also contain authigenic (hydroqenous) components such as fer-romanganese phases which are rich in selected trace elements (Chester, R., and Aston,S. R., The Chemistry of Deep-sea sediments; In Chemical Oceanography, Eds Riley, J. P., and Chester, R. Vol. 6,34, 281–383, (1976)].

Deep-sea carbonates on the other hand have a rapid rate of deposition (greater than 10 mm per 100 years) and contain a significant proportion of calcareous shell debris which is usually relatively impoverished in trace elements other than strontium, [Berger, W., H., Biogenous Deep-sea sediments: production, preservation and interpretation, Chemical Oceanography, Eds Riley, J. P., and Chester, R. Vol.5, 29, 265–372, (1976)]. The pelagic environment embraces a little over half of the Earth's surface (268 of 510. $10^{-6}$ $km^2$), of which about half the deep sea floor is covered by calcareous oozes and is thus the most widespread crustal covering material (approximately 25%) of the planet's surface, [Berger, W., H., Biogenous Deep-sea sediments: production, preservation and interpretation. In Chemical Oceanography, Eds Riley, J. P., and Chester, R. Vol.5, 29, 265–372, (1976)].

Accordingly, the present invention provides a process for disposal of gaseous carbon dioxide comprising the steps of:
 solidifying carbon dioxide; and
 at least partially embedding the solid carbon dioxide in open water floor sediment.

The open water is usually the sea. The carbon dioxide may be sequestered into the sedimentary sea floor.

Preferably the sea floor sediment is the carbonate rich sediment unbiquitous in the sedimentary formations of the ocean which occur at depths less than the carbonate compensation depth (CCD) at around 4 km deep and which form a natural stable sink for carbon once they have been laid down. An alternative preferred sea floor sediment is the soft clay-type sediment at 4 km or deeper which also acts as an effective barrier to the release of carbon dioxide to the atmosphere.

The present invention depends on the fact that carbon dioxide can be obtained as a solid by cooling to −78.5° C. Its overall specific gravity when frozen is approximately one and a half times (1.56) that of seawater.

The present invention also provides a vehicle for disposal of carbon dioxide comprising solidified carbon dioxide in a form the physical dimensions of which allow it to at least partially embed itself in the open water sedimentary floor when allowed to free fall through open water. Hereinafter such a vehicle is described as a solid carbon dioxide penetrator. A preferred embodiment comprises the frozen carbon dioxide in the form of a hydrodynamic shape, for example a torpedo shape. In such a preferred embodiment, the solid carbon dioxide when allowed to fall through open water will penetrate soft sediments on the sea floor.

Preferably the carbon dioxide is anthropogenic waste gas removed directly from its source before diffusion into the atmosphere.

Partial embedment of the solid carbon dioxide penetrator occurs when the penetrator does not embed itself completely in the open water floor. This occurs in the case of small penetrators weighing 5 ton or less, having a density of 1.5 kg $dm^{-3}$ or less. Where this density is higher, the penetrator weight is lower for equivalent partial penetration. For the purposes of the disposal of carbon dioxide according to the present invention it is preferable that the solid carbon dioxide penetrator completely embeds itself in the open water floor. A terminal velocity of at least 20 m/s is required for the solid carbon dioxide to totally embed itself in open water sedimentary floor.

Terminal velocity, density and sediment shear strength must be taken into account in the penetrator design. A critical factor to enable sufficient depth of penetration into the bottom sediment is the density of the penetrator. In order to increase this the solid carbon dioxide may be mixed with shavings of some dense metal during manufacture or clad with either some dense metal or plastics material, for example, in a tube around the solidified carbon dioxide. Alternatively, the penetrator may have a solid metal nose cone. Experiments have been undertaken in the abyssal Atlantic Ocean using similarly designed streamlined projectiles showing that sediment penetration depths greater than 30 m can be obtained for torpedoes made out of steel, weighing as little as 2000 kg.

Any hydrodynamically efficient form of solid carbon dioxide that is a form which when allowed to free fall through open water will at least partially embed itself in the open water floor. For example a substantial block of solid carbon dioxide would not embed itself because it would not have a sufficient terminal velocity following free fall through open water. However if it were placed in a depleted uranium casing (with a density of over 18 $kg.dm^{-3}$) the extra density would be likely to result in partial embedment. A sphere of carbon dioxide similarly encased would have sufficient density for partial embedment to be attained.

Production of the penetrator may be carried out at an industrial coastal site or on a floating platform at the chosen site of disposal. Preferably the penetrator is prepared such that its surface is hydrodynamically smooth for launching.

One method to ensure this is to solidify the carbon dioxide in a vertical tube made out of a flexible or rigid thermal resistant plastic or metal having the overall dimensions and shape of the proposed penetrator; there is preferably a metal (steel) nose cone which acts as a heat shield and ensures good hydrodynamic flow through the water columns and sufficient sediment penetration.

The verticle penetrator in its tube is then prepared for launching. Heating the tube slightly (using an electrical coil embedded in the launch tube) causes sublimation of the solid carbon dioxide surface directly in contact with the tube and the released gas acts as a lubricant allowing the penetrator to slide out of the launch tube under its own weight. The heating technique also ensures that the resulting penetrator surface is naturally smooth to provide good hydrodynamic performance through the water column. Tube tail fins can also be clamped onto the aft-section of the penetrator before launching is initiated.

In order to avoid significant dissolution of carbon dioxide from the penetrator during its passage through water the penetrator may further comprise a layer of frozen liquid on its surface. Preferably the frozen liquid is an ice-water combination. The process for the disposal of gaseous carbon dioxide may thus include solidification of the carbon dioxide inside a frozen liquid mould, filling a frozen liquid mould with solidified carbon dioxide and/or substantially surrounding the solidified carbon dioxide mass with a layer of frozen liquid.

The invention further provides a mould comprising frozen liquid for use in a process for the disposal of gaseous carbon dioxide as claimed in claim 1 or for use in combination with a vehicle as claimed in any one of claims 13 to 15.

The present invention will now be described by way of example only, with reference to the accompanying drawings, in which.

Hereinafter are details of some of the main factors that must be taken into account on the engineering and geochemical aspects of the present invention. These include solid carbon dioxide penetrator design, free-fall water column velocity and dissolution rate, sediment embedment depth and subsequent geochemical behaviour of carbon dioxide within a carbonate-rich sediment of clay matrix. An estimate of the numbers of penetrators that might be necessary for the disposal of the yearly production of carbon dioxide from a IGW coal fired power station, is also included.

The drag coefficient of the penetrator may alter as it free-falls through the water column due to the very cold carbon dioxide surface freezing a very thin film of ice over the penetrator body. This film may act to decrease the friction between the penetrator surface and the water as its surface would be particularly smooth, rather like an ice-cube when introduced into water, thus increasing the terminal velocity. It is advantageous to have the penetrator's nose cone made out of metal to allow proper hydrodynamic flow over the penetrator body and to act as a heat shield for the penetrator. This has the further advantage of increasing the overall density of the penetrator leading to an increased terminal velocity.

The attainable free-fall velocity or terminal velocity of the penetrator is determined by the equilibrium of buoyant and hydrodynamic drag. In order to maximize velocity, the penetrator design attempts to avoid drag as much as possible, and to reduce drag to bare surface friction. Evaluation of drag coefficients for any given shape is based on semi-empirical methods which are in routine use in the aeronautical industry. The applicability of aerodynamic data to a hydrodynamic problem is fundamentally correct due to the Newtonian fluid characteristics of both air and water, and is further simplified according to the present invention due to the very high hydrostatic pressures which prevent possible cavitation.

Overall vehicle drag ($C_D$) involves three factors:
1) $C_{Da}$-pressure drag due to truncated tail (so-called after body drag);
2) $C_{Df}$-profile drag (friction+pressure) due to boundary layer; and
3) $C_{Dr}$-additional drag due to localised roughness and/or excrescences Such that:

$$C_D = C_{Da} + C_{Df} + C_{Dr}$$

Figure 1:
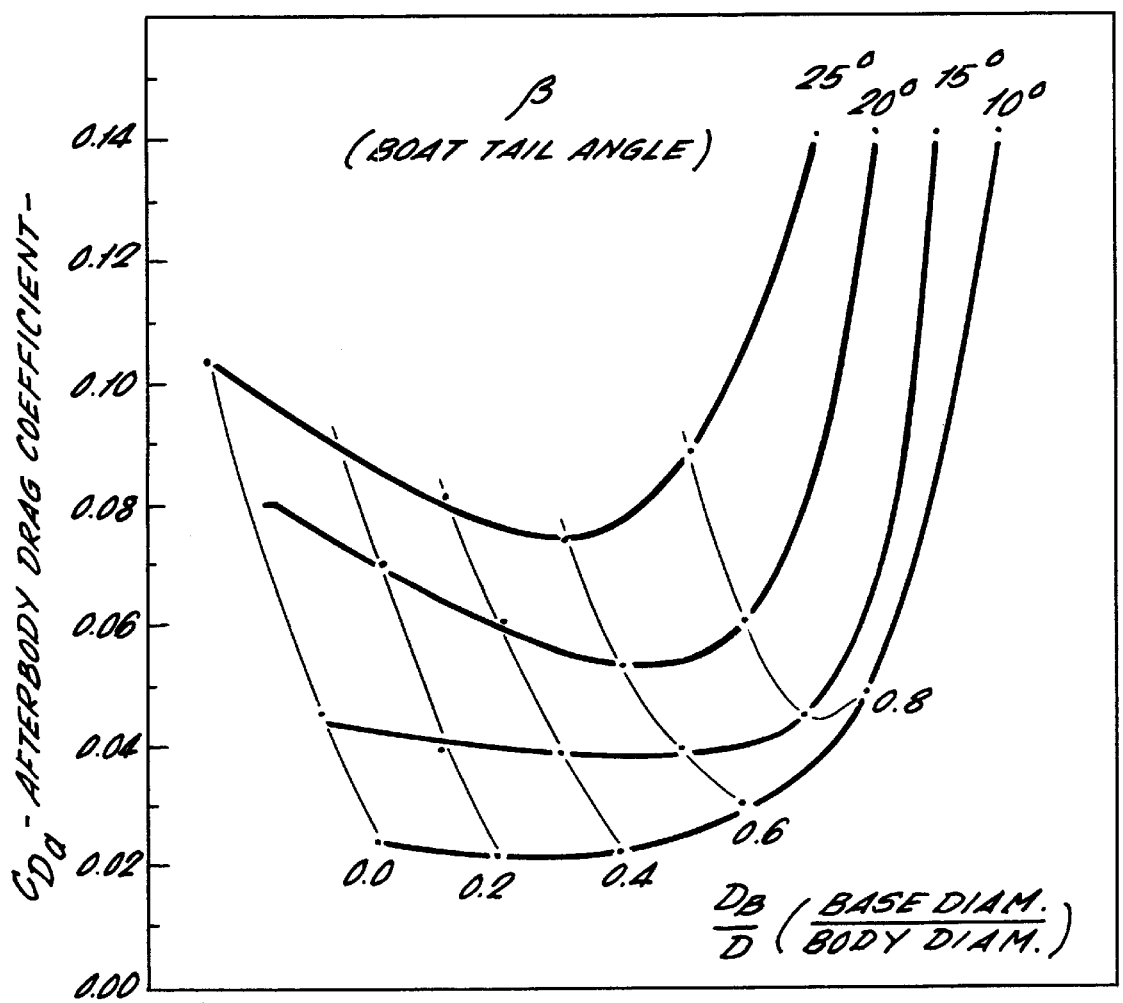
FIG. 1 is a graph showing afterbody drag coefficient, Cda of conical boat-tails.
Figure 2:
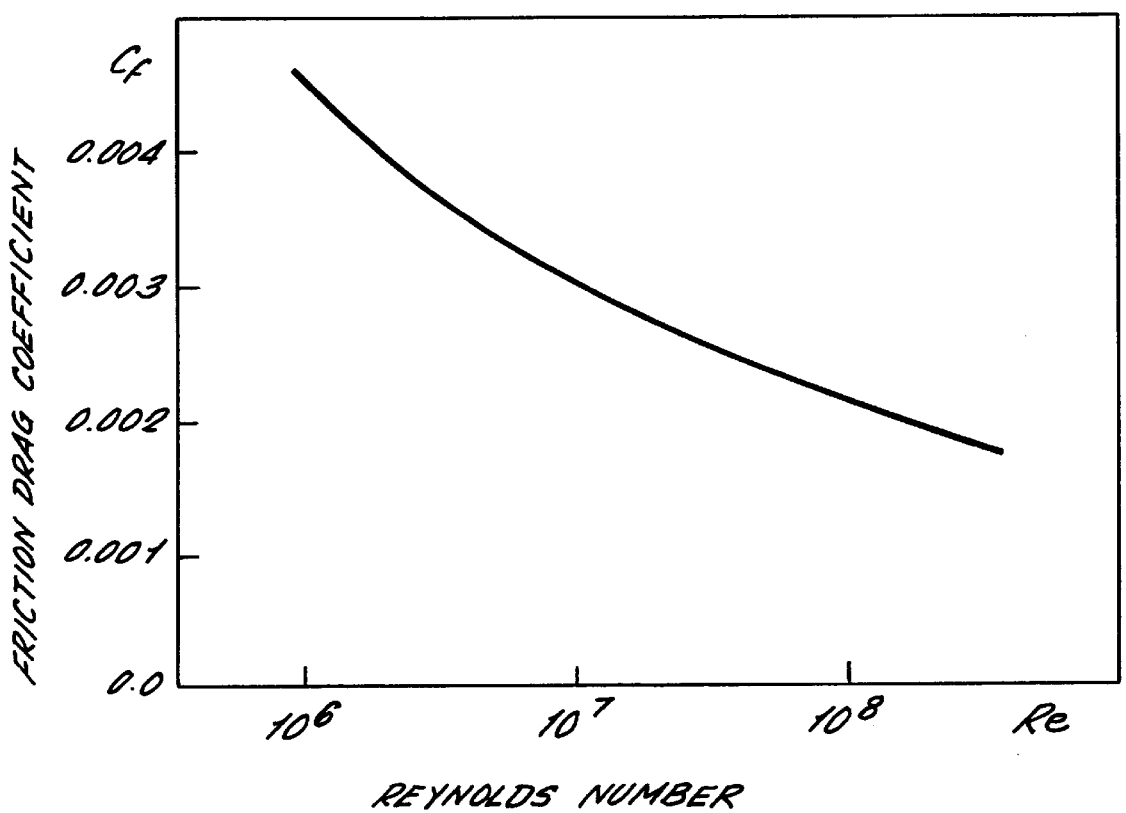
FIG. 2 is a graph showing skin-friction drag coefficient of a turbulent boundary layer on a flat plate (Karman-Schoennherr formula).
Figure 3:
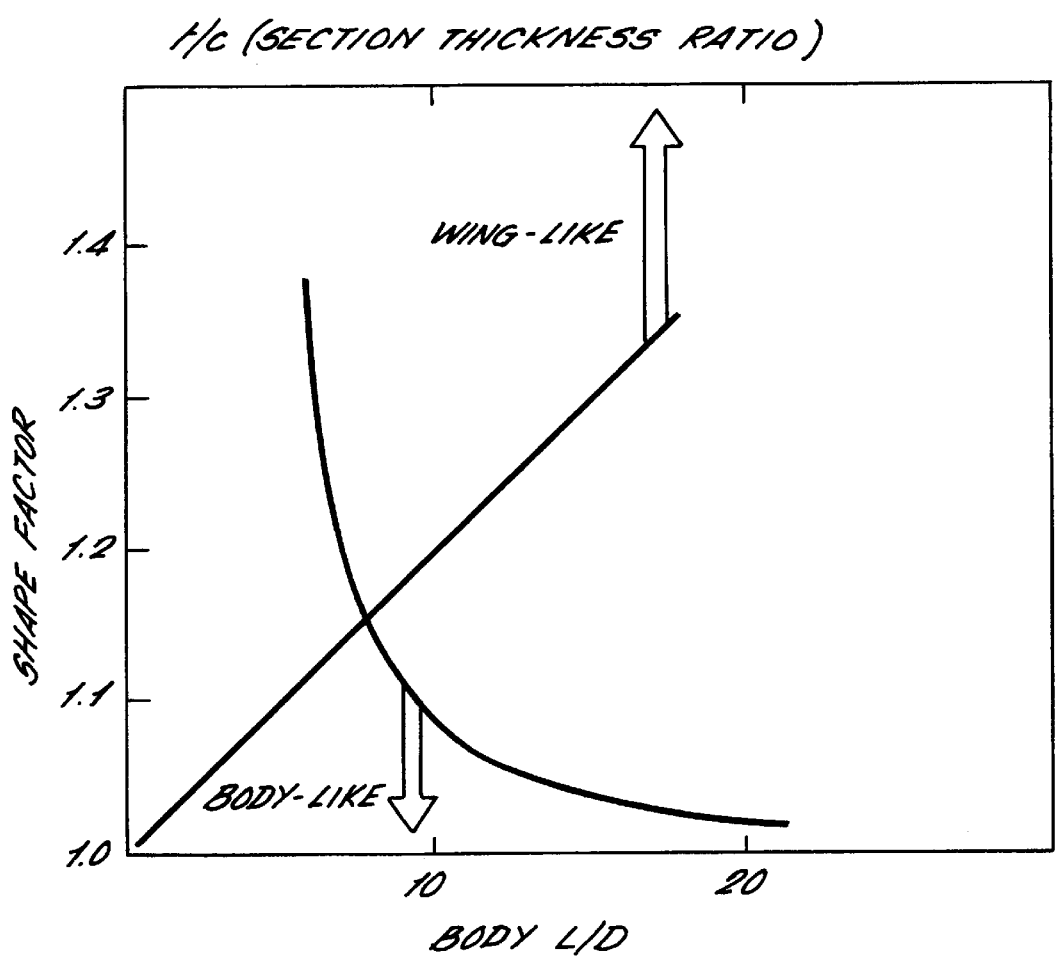
FIG. 3 is a graph showing empirical shape factors of wing-like and body-like components of a configuration.

After body drag is evaluated from a correlation of empirical data (FIG. 1). Friction drag of each component (body and fins) is proportional to flat plate friction at the same Reynolds number (FIG. 2) corrected by a "shape factor" that takes into account local super velocities (FIG. 3), with reference to the correct surface.

Thus $C_{Df}A$ (can be expressed by the following formula::
$C_{Df}A$=Total summation $C_f S_w$(S.F.) the summation being extended to the number of components wherein:

A=penetrator body cross-section area (taken also as a reference surface for hydrodynamic coefficients $C_D$, $C_{Df}$, $C_{Dr}$), $S_w$=penetrator wetted surface, S.F.=shape factor and $C_f$=friction drag coefficient relative to a reference surface
The boundary layer between the penetrator and the water column is assumed to be fully turbulent due to the very high Reynolds number involved (of the order $10^8$). The surface of the penetrator is considered to be "hydrodynamically smooth", that is with average roughness lower than a critical value.

Figure 4:
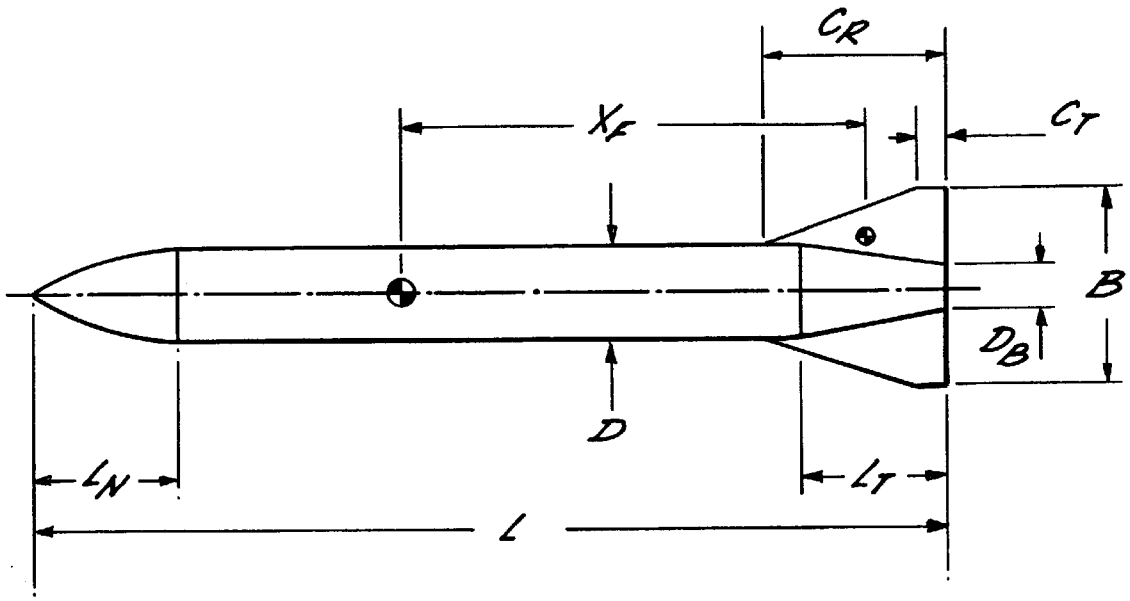
FIG. 4 is a schematic shape of a vehicle according to the present invention.

FIG. 4 shows a schematic shape of penetrators according to the present invention wherein:

$L_N$=nose length

L=total penetrator length $L_T$=tail length $D_{ia}$=penetrator body diameter $C_R$=fin root chord $C_T$=fin tip chord $D_B$=base diameter B=fin span $X_F$=fin arm (from centre of gravity of the penetrator to one quarter of mean aerodynamic chord)

Figure 5:
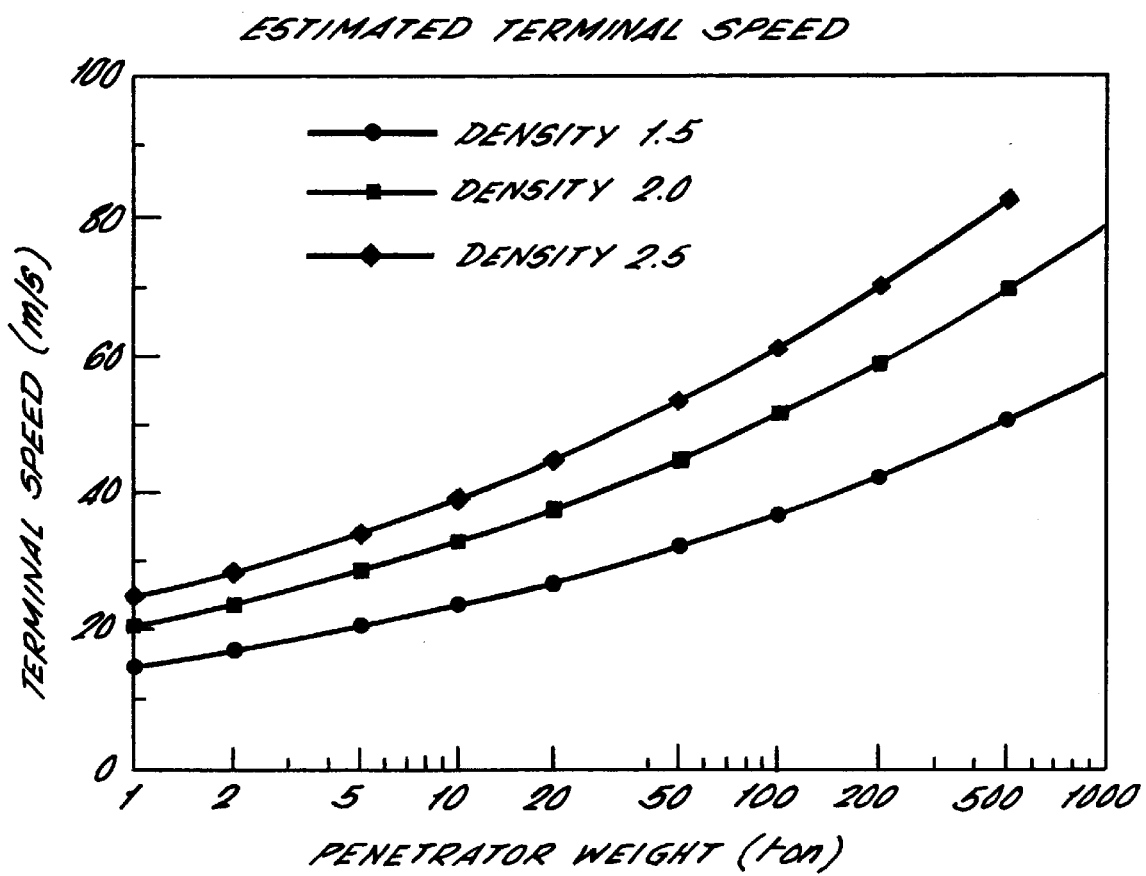
FIG. 5 is a graph showing the variation of terminal velocities with penetrator density and weight.

A series of hydrodynamic calculations on the proposed configuration (FIG. 4) have been undertaken for a large range of penetrator weights. The results are shown in (FIG. 5) for a series of penetrators from 5 to 1000 tonnes and for three specific gravities, 1.5 (pure solid carbon dioxide), 2.0 and 2.5 (to show effect of variations in specific gravity). The velocities attained by the range of penetrators and the depth of embedment they would reach are shown in Table 1. On the basis of these calculations it would appear that significant free-fall velocities (to obtain complete tail penetration) can be obtained even with penetrators of less than 100 tonnes at the natural specific gravity of solid $CO_2$.

TABLE 1

Terminal Velocity and Tail Penetration for Various Penetrator Masses and Densities

| Penetrator Weight | Terminal Velocity (ms$^{-1}$) Density (kg dm$^{-3}$) | | | Tail Penetrator Depth (m) Density (kg dm$^{-3}$) | | |
|---|---|---|---|---|---|---|
| (tonnes) | 1.5 | 2.0 | 2.5 | 1.5 | 2.0 | 2.5 |
| 5 | 20.3 | 28.5 | 34.1 | 0.4 | 7.2 | 12.5 |
| 10 | 23.2 | 32.8 | 39.0 | 1.6 | 10.5 | 17.3 |
| 20 | 26.6 | 37.3 | 44.8 | 3.2 | 14.6 | 23.5 |
| 50 | 31.9 | 44.8 | 53.7 | 6.5 | 22.4 | 34.7 |
| 100 | 36.4 | 51.6 | 61.1 | 9.8 | 30.4 | 45.8 |
| 200 | 41.6 | 58.6 | 69.5 | 14.1 | 40.1 | 59.6 |
| 500 | 49.7 | 69.3 | 82.2 | 22.1 | 57.4 | 84.2 |
| 1000 | 56.9 | 78.5 | ~100 | 30.5 | 74.4 | ~120 |

An important factor in carrying out the method of the invention is the dissolution of carbon dioxide from the penetrator during free-fall through the water column and whether this results in a significant loss of mass from the carbon dioxide penetrator. Dissolution of carbon dioxide depends on a number of factors including the temperature and pressure of the surrounding sea water, the velocity that the penetrator attains during its descent and thus the length of time it is effectively in the water column.

Examples of estimated weight loss for penetrators of 500 tonnes but different densities, after free-fall through a water column to a disposal site at 4000 m deep, are given in Table 2.

TABLE 2

Weight Loss after Free-fall through Water Column for 500 tonnes penetrator at a site 4000 m deep (for different overall densities)

| Overall Density (Kg. dm$^{-3}$) | Penetrator free-fall time (sec) | Weight Loss. (Kg) × 1000 |
|---|---|---|
| 1.50 | 80 | 6.9 |
| 2.00 | 73 | 6.3 |
| 2.50 | 50 | 4.3 | wherein the weight loss is calculated on the basis of $CO_2$-ice/ice-water interface.

As the penetrator (at an approximate temperature of −100° C.) is travelling in relatively warmer water (approximately 5° C.) the temperature difference will produce a heat flux from the water to the penetrator inducing a possible loss of penetrator mass. The mechanism involved is forced convection across a turbulent boundary layer and conventional procedures can be used for an approximate prediction. The exact nature of this boundary layer is uncertain. It may be of liquid water or of solid carbon dioxide covered by a thin layer of water-ice which is then in contact with the surrounding liquid water. The theory of both possibilities is hereinafter expanded upon.

The methodology used in the present assessment is normally applied to the prediction of surface heat flux on bodies travelling at high speed in air. The main difference between air and water in this particular case is in the Prandtl number (Pr=$\mu$.Cp/k) which is about 0.7 for air and of the order of 10 for water. The assessment has been made for the heat flux along a cylindrical surface. To reduce uncertainty it is assumed that the penetrator has a small nose cone to give a little added density and to strongly decrease nose heat flux (i.e to act as a heat shield). The following values, based on pure water at approximately 5° C., have been used for a first estimate:

density ($\rho_w$)=1000 kg.m$^{-3}$
viscosity ($\mu$)=1.57.10$^{-3}$ kg.m$^{-3}$.sec$^{-1}$
specific heat ($C_p$)=4204 kJ. kg$^{-1}$.° C.
heat conductivity (K)=0.57 W.m$^{-1}$.° C.

The penetrator is assumed to have a mean free-fall velocity of 50 m.sec$^{-1}$ and a temperature difference of ~78° C. The heat of sublimation of $CO_2$ is 188 kJ.kg$^{-1}$.

For a body moving at 50 ms$^{-1}$ in water, heat exchange coefficients are very high and can be estimated to be of the order of 45 KW m$^{-2}$ ° C.$^{-1}$. Uncertainties in the estimate are due to the very high Reynolds numbers involved, to the nature of the surface and the possible presence of a two-phase flow. The large values of heat exchange coefficients create very high heat fluxes even for moderate temperature differences between the body and the surrounding water. In the present case the heat flux between water and ice ($\Delta T=5°$ C.) would be 225 KW m$^{-2}$, increasing to as much as 3.4 MW m$^{-2}$ in the case of water and solid carbon dioxide ($\Delta T=78°$ C.)

Such heat fluxes are very much higher than any conduction heat flux that can be absorbed by the penetrator assuming that its core temperature is –100° C. In fact across a layer of ice 1 cm thick the heat flux is calculated to be about 24 KW m$^{-2}$ for a $\Delta T$ of 100° C. and as low as 1.5 KW m$^{-2}$ across an equivalent layer of carbon dioxide, which has a low thermal conductivity [Gmelins Handbuch Der Anorganischen Chemie, Kohlenstoff, Teil C, Lieferung-1, 584 pages, Verlag Chemie GhbM, Weinheim, Germany, (1970)] and where the temperature difference would be limited to –22° C. (–100° C. to –78° C.).

As a consequence the surface of the penetrator will in all cases be driven rapidly (in less than one second) to its temperature of phase change. The difference between the water and the body will thus produce a corresponding phase change of the material at the surface. The nature of this surface material will thus play an important role in affecting dissolution losses. For example if the solid carbon dioxide would be directly in contact with liquid water, the resulting values are a heat flux of 2.7 MW m$^{-2}$ and a thickness consumption of approximately 10 mm s$^{-1}$; a very high dissolution rate. However, in the case where, before accelerating to terminal speed, the very low temperature of the $CO_2$ leads to the formation of a layer of solid water-ice on the surface of the penetrator, the heat flux would be reduced to 225 KW m$^{-2}$. The ice would still be melted progressively, but in this case at a rate of about 0.7 mm s$^{-1}$ because of the lower heat flux and higher liquefaction heat. Under these conditions the formation of a layer of 40 mm would effectively act as insulation and protect the $CO_2$ for the duration of the fall.

An estimate of this phenomenon can perhaps be obtained from in-situ experimental measurements [Nakashiki, N., Ohsumi, T., Shiashima, K., Central Research Institute of Electric Power Report "Fall velocity and dissolution rate of solid carbon dioxide in the ocean", 17 pages (1991)] for the rate of dissolution of carbon dioxide. Values reported are 0.023 gm.sec$^{-1}$.cm$^{-2}$ for a block of carbon dioxide having a descent velocity in the order of less than 1 m per second, at water temperatures of around 25° C. and at a pressure of one atmosphere. It should be noted, however, that these are considerably different from deep ocean conditions of around 2° C. and several hundred atmospheres and that heat exchange coefficients are roughly proportional to velocity.

Nevertheless, for a penetrator weighing 500 tonnes the rate of loss of material in the water column can be calculated to be about 87 kg s$^{-1}$ although this does not take into account the effect of velocity. Using an integrated free-fall time of 75 seconds, this turns out to be about 5 tons, a negligible amount (~1%) compared to the overall intial weight of the penetrator A detailed investigation of thermal exchange processes over a larger range of ocean depths have been made on the basis of the pressure-temperature phase relationship shown in FIG. 6. It can be seen that under ocean conditions from about 40–1100 atm (or equivalent 400–11000 m ocean depth) carbon dioxide will remain as a solid at temperatures below –56° C. to 2° C. (depending on depth), and form a clathrate at natural ocean temperatures between about 2–10° C.

Thermal exchange conditions are shown in Table 3 for a 1000 t penetrator. These may be compared with the in-situ experimental measurements described in Nakashiki et al 1991 referred to above.

Figure 6:
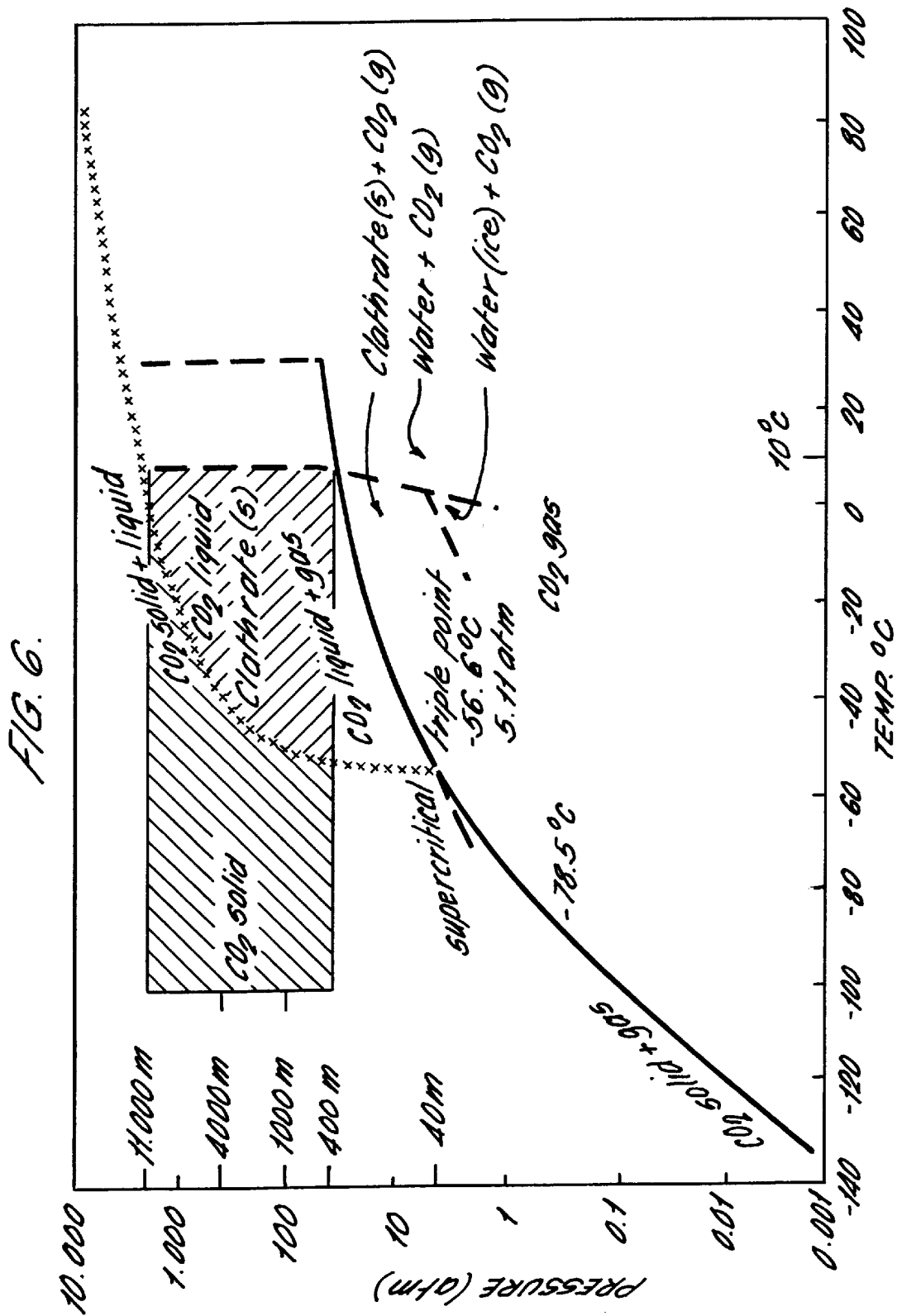
FIG. 6 is a phase diagram for a carbon dioxide/water system over a range of temperatures and pressures.

Results are shown in Table 4 for an arbitrarily selected (however non-exclusive) series of depths (1–4 Km) from within the limits indicated in FIG. 6 to investigate the range of dissolution that may occur.

TABLE 3

Thermal Exchange Conditions in a Water Column: Dissolution Rates for a 1000 + Penetrator

| | Solid $CO_2$ Arrangement | Heat Flux | Thickness Consumption (approximately) |
|---|---|---|---|
| (i) | Solid $CO_2$ directly in contract with liquid water | 2.7 MWm$^{-2}$ | ≦10 mms$^{-1}$ |
| (ii) | Solid $CO_2$ leads to the formation of a layer of solid water-ice on the surface of the penetrator | reduced to 225 KWm$^{-2}$ | ≦0.7 mms$^{-1}$ |

Under the conditions (ii) the formation of a layer of ice 40 mm thick would effectively act as insulation and protect the $CO_2$ for the duration of the fall.

TABLE 4

Results of the Effect of Disposal Site Depth On Dissolution Losses for a 1000 t Penetrator

| | Assumed | Penetrator Weight Loss (tons) | | |
|---|---|---|---|---|
| Site Depth (m) | Integrated Free Fall Time (sec) | Situation (i) From table 3 | Situation (ii) From table 3 | in-situ experimental measurements* |
| 4000 | 75 | 300 (or ≈ 30%) | negligible | 11 (or ≈ 1%) |
| 3000 | 55 | 225 (or ≈ 22%) | negligible | 8 (or less than 1%) |
| 2000 | 38 | 150 (or ≈ 15%) | negligible | 5.5 (or less than 0.5%) |
| 1000 | 19 | 75 (or ≈ 8%) | Negligible | 2.5 (or less than 0.3%) |

*(from Nakashiki etal 1991, experimental data obtained for velocities of ≈ 0.5 m$^{s-1}$.)

Table 4 clearly shows that there is a very large variation in the estimated dissolution losses depending on the mechanism of heat exchange but that the range of disposal depths is much greater than originally considered, with storage possible in as little as 1000 m of water or less. Also shown is that even assuming the highest dissolution rate (case (i) for each depth) the losses at a coastal site are probably acceptable.

The thermal calculations have, however, shown that the formation of even a fairly thin layer of water-ice on the surface of the carbon dioxide penetrator should significantly decrease the dissolution losses. As stated under table 3 "the formation of a layer of 40 mm would effectively act as insulation and protect the carbon dioxide for the duration of the fall".

On the basis of the more detailed investigations on the stability range and, therefore, possible depth of geological formations that could be used for storage (down to 11000 m, FIG. 6) and the effect of ice-water insulation on dissolution rates it is shown that carbon dioxide losses can be significantly reduced.

Liquids other than water such as seawater and some hydrocarbon solvents can also be used as an insulator in the same fashion.

Figure 7:
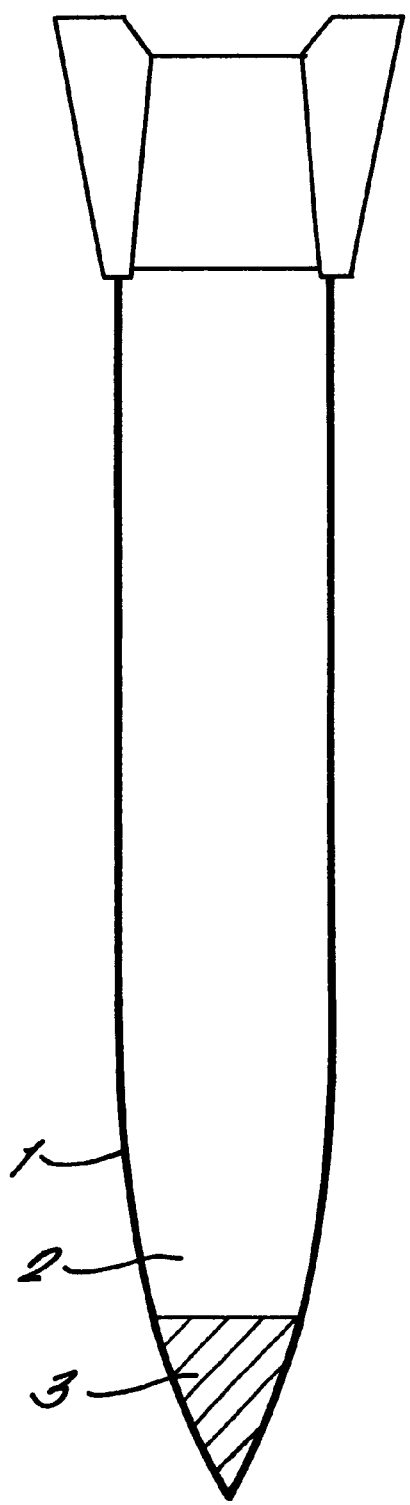
FIG. 7 is a schematic representation of a frozen liquid mould for use in combination with a vehicle according to the present invention. This Figure shows an ice-water insulating layer (1) surrounding solidified carbon dioxide (2) in a torpedo shape with tail, fins and a metallic nose core heat shield (3).

Alternatively, in order to ensure minimum loss of carbon dioxide, even for disposal at great depths, the ice film may be pre-formed as a hollow water-ice penetrator (FIG. 7) having a wall thickness greater than that which would be consumed during its free-fall through the water column at the chosen disposal site. The water-ice penetrator may be formed with or without a metallic nose-cone (as heat shield) and its hollow internal volume could then be filled with solid carbon dioxide.

Use of an ice-water wall surrounding the penetrator is described in Example 2 below.

Large areas of deep ocean geological formations are made up carbonate-rich sediments. They form a natural stable repository and are a result of environmental processes over geological time scales which have affected oceanic and thus atmospheric carbon dioxide concentrations. In order to estimate the behaviour of a fast moving torpedo shaped body it is necessary to assess the processes that will control interaction between the penetrator and the surrounding sediment. Two features need to be considered, depth of penetration and hole closure.

The drag forces acting on a penetrator moving within a sediment have been estimated for the purposes of the present discussion using simple semi-empirical formulations. The drag force is proportional to the undrained shear strength of the sediment and, after full embedment, is given by a nose-bearing term proportional to body cross-section, and a friction term proportional to body-wetted surface:

$$D=D_N+D_F=N_{ed} \cdot A_u \cdot {}_dS_wC_u$$

where:

D=Overall retarding force due to soil forces
$D_N$=Retarding force due to nose-bearing capacity
$D_F$=Retarding force due to surface friction
A=Penetrator body cross-section
$S_w$=Penetrator wetted surface
$C_u$=the sediment undrained shear strength. Sediment can be consolidated to be in a normally consolidated state and $C_u$ is a function of depth. A linear relationship $C_u$=5+1.2z $kNm^{-2}$ where z=depth from sediment surface (penetration depth) has been used as it correlates well with reported data,[O. Arup et al., Ocean disposal of high-level radioactive waste, penetrator option. Dept. Environment. Rep, DOE/RW/82.102 (1982)); [O. Arup et al., Ocean disposal of high-level radioactive waste. Dept. Environment. Rep. DOE/RW/82.055 (1982)], and has thus been assumed as nominal shear-strength profile;

$N_{ed}$=an effective dynamic nose-bearing capacity coefficient which, from empirical date, can be assumed to be equal to 20, based on the same reported data; and $_d$=a dynamic friction coefficient, including the effect of sediment sensivity which, again from (limited) empirical data, is assumed to be equal to 0.4.

During partial embedment of the penetrator the following relationship holds:

$$D=D_N+D_F+D_H$$

where $D_H$=Residual hydrodynamic drag during partial embedment
Thus:

$$D=N_{ed}AC_u+ {}_dS_eC_u+½\rho_wAV^2C_D(1-S_e/S_W)$$

where $N_{ed}$=Dynamic nose-bearing capacity coefficient
$\rho_w$=Density of water
$C_D$=Hydrodynamic drag coefficient (overall vehicle drag)
$S_e$=Embeded penetrator surface
V=Velocity In this case friction only acts on the embedded surface $S_e$ while a residual hydrodynamic drag acts on the rest of the surface. Nose-bearing factor $N_{ed}$ is equal to 18 due to the absence of tail contribution.

Figure 8:
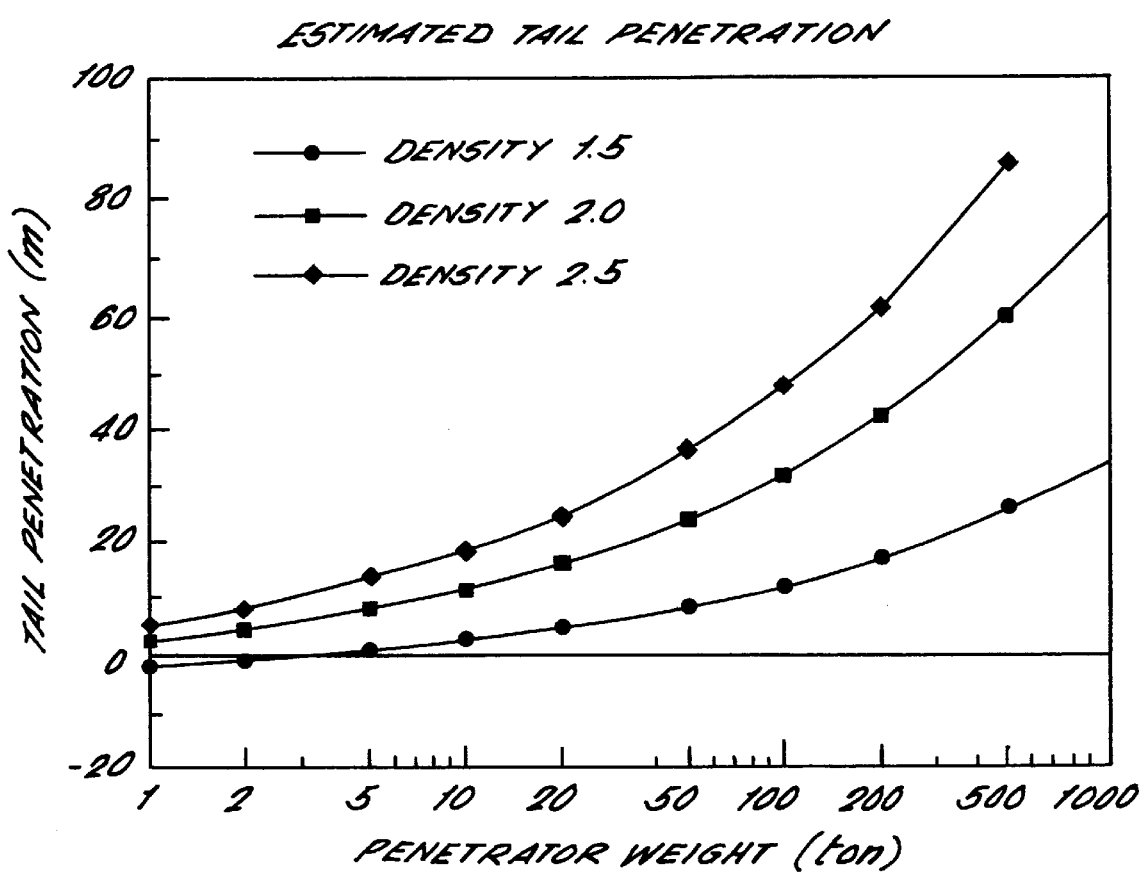
FIG. 8 is a graph showing the variation of tail penetration with penetrator density and weight.

FIG. 8 shows effects of penetrator weight and density at constant shape (length:diameter) on the embedment depth. One clear indication is that an increase in density is a more efficient way to increase penetration than an increase in overall weight. Clearly, although a greater penetration capability through increased overall density would be useful in order that complete embedment of lighter penetrators would be possible, this could only be attained by cladding penetrators with some dense material such as steel (specific gravity approximately 7.8). An increase in overall specific gravity from 1.56 (solid $CO_2$) to 2.0 or 2.5 represents an increase in weight of approximately 28% and 60% respectively for a constant penetrator volume; a non-negligible quantity.

It would thus appear that there is a lower limiting weight for this penetrator technique to ensure complete tail embedment. Table 1 compares tail penetration for different weights of penetrators. It can be seen that pure $CO_2$ penetrators of around 100 tons can embed themselves to significant depths (approximately 10 ) in soft deep ocean sediment formations. Penetrators of larger weight can reach greater depths.

A further point that should be considered in assessing the effectiveness of the sediments as a stable sink for carbon dioxide is to what degree the geological barrier is disturbed by the penetration event. Theoretical studies [Dzwilewski, P. T., Karnes, C. H. Hole closure behind a deep ocean sediment penetrator. Subsea Program, Annual Report, January–September 1981. Vol II, Part 2, Appendix GG. SAND 82-0664/1 (1982)]; (Waine B. R., Ewington, P. J. Investigations into the closure characteristics of a sedimentary formation during the passage of a deep ocean penetrator. Phase III, Modelling of hole closure mechanisms. In: JRC Report Series Study of the feasibility and safety of the disposal of heat generating wastes into deep oceanic geological formations: Engineering investigations for sub-seabed emplacement, SP.I.07.C2.86.08/III (1986)] suggest that an open pathway to the sediment surface is unlikely, and that during the embedment process, the penetrator creates large sediment deformations in its passage, leading to an inflow of surficial sediments due to the suction forces generated by the water that is drawn into the entry path. This causes the sediments to close behind the penetrator. No cavitation can occur due to the high ambient pressures at the depths being considered.

The behaviour of the penetrator material once it has been successfully emplaced in a deep ocean geological formation will clearly depend on its interaction with the host formation under the prevailing in-situ conditions of temperature, pressure and geochemical environment. Soft clay-carbonate sediments are an ideal environment for this type of storage as it makes use of the natural conditions of the environment to permanently sequester the carbon dioxide. Deep ocean sediments at depths of greater than 3000 m having soft clay or carbonate rich characteristics, amount to many millions of square kilometers and pore water movement can be negligible over large areas thus effectively permanently isolating the carbon dioxide from the overlying ocean waters.

Figure 9:
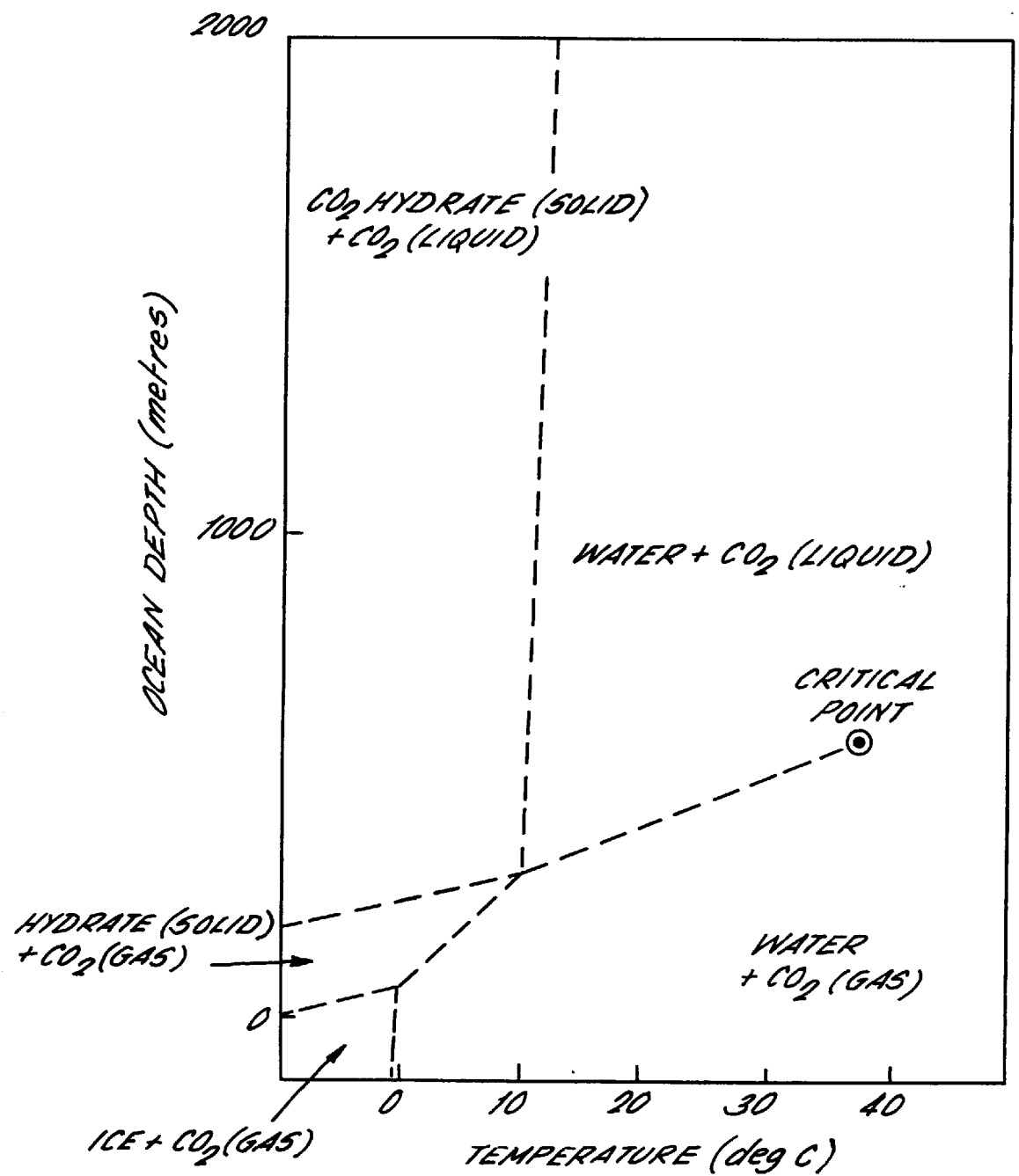
FIG. 9 is a phase diagram for a carbon dioxide/water system over a range of temperatures and depth.

At the in-situ pressure and temperature (approx. 500 atm and 2° C.) the thermodynamically stable form of carbon dioxide in the presence of water is a solid-like clathrate compound in which carbon dioxide molecules are held in a cage made up of water molecules. Observations in the sea of Japan at depths greater than 1500 m have identified geothermal heated fluids containing very high concentrations of carbon dioxide. This has been found to precipitate on cooling once the temperature is less than 10° C., thus confirming solid clathrate as the equilibrium state of carbon dioxide in the $NaCl-CO_2-H_2O$ ternary system (FIG. 9). During attainment of thermal equilibrium at the emplacement depth in the bottom sediments, the carbon dioxide penetrator will pass through a transient phase composed of liquid carbon dioxide and solid hydrate at the sediment-penetrator interface. Further away, the interactions of the pore waters and the surrounding sedimentary formation will control the final chemical form of the penetrator.

The local increase of dissolved carbon dioxide will affect carbonate reactions in both aqueous and solid phases, leading to pH decrease with concomitant dissolution of minerals in the sediments.

As a first approximation, the change of pore water composition can be estimated by considering the area around the penetrator as an infinite reservoir of carbon dioxide and in thermodynamic equilibrium with the surrounding sediment pore waters at the in-situ temperature and pressure (e.g. 2° C. and 500 atm). At equilibrium, all solid carbon dioxide will be transformed into a clathrate. It is therefore convenient (from a thermodynamic point of view) to consider the clathrate as the dissolving solid. This will equilibrate with a sediment of infinite buffering capacity, i.e. in the presence of a large excess of base supplying minerals. Clathrate behaviour has been studied theoretically under deep ocean conditions, although not under conditions within a marine geological formation. The equilibrium constant for the formation of the clathrate has been calculated as follows:

$$CO_2(g)+7.3\ H_2O(l)=CO_2\text{-Clathrate}(s) \qquad (A)$$

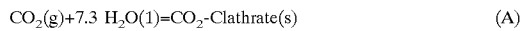

from the eutectic; ice+water+vapour+clathrate at −1.48° C. and $pCO_2$ of 10.28 Atm. The number of $H_2O$ molecules per molecule of $CO_2$ varies depending on the temperature, bulk composition and pressure. The clathrate structure stablised by $CO_2$ incorporation contains 46 molecules of water arranged in such a way to form 2 small and 6 large cavities. Filling of the large cavities only gives the composition $CO_2.7.3H_2O$, whereas complete filling gives $CO_2.5.75H_2O$. It has been assumed that uncomplete filling of the cavities occured due to the water-rich part of the P-T diagram (FIG. 9). The pressure and temperature in the sub-seabed around the $CO_2$ penetrator (2° C. and 500 atm) are located in the $CO_2$-rich part of the $CO_2-H_2O$ phase diagram. The clathrate structure is likely to be filled completely with $CO_2$ molecules, thus giving $CO_2.5.75H_2O$. Equation (A) above was used for a preliminary thermodynamic evaluation, assuming that value of the equilibrium constant was valid also for the completely $CO_2$-filled clathrate. The presence of dissolved electrolytes reduces the stability field of the clathrate. This is mainly due to the depression in the activity of water, rather than to a change of the clathrate composition. Ionized species cannot enter the hydrogen-bonded structure of the $CO_2$-hydrate.

Taking into account the effect of pressure, temperature and salinity on the values of the relevant thermodynamic constants, a reaction scheme can be constructed with $CaCO_3$ (s) as a model compound of the dissolving minerals in the sediments. Solid carbonates such as calcite, aragonite and magnetite are efficient pH buffer systems. This gives a pH value of porewater of 3.9. However, alumino silicates in sediments exhibit an even stronger pH buffer capacity, although the kinetics of their reactions are slower than for carbonates. Thus, the high pH buffer potential of soft clay carbonate sediments suggests this to be an appropriate environment for the emplacement of carbon dioxide.

An initial estimate of the amount of calcite reacting with the clathrate can be made on the basis of the summarising equation:

$$CO_2\text{-Clathrate}(s)+CaCO_3(s)=Ca^{2+}(aq)+H_2CO_3{}^*(aq)+4.75\ H_2O(l)$$

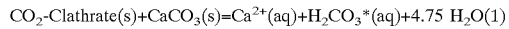

Where $$H_2CO_3{}^*(aq)=CO_2(aq)+H_2CO_3(aq)$$

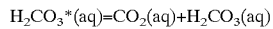

is the predominant dissolved carbonate species at pH 3.9. To simplify the problem, the disposal volume is taken to be a spherical point of solid carbon dioxide (density 1.56 Kg $dm^{-3}$) weighing $1\times10^6$ Kg, its radius being approximately 5.4 m. Each penetrator will contain $2.4\times10^7$ moles of $CO_2$ which would then dissolve about $2.4\times10$ Kg of calcium carbonates. With a $CaCO_3(s)$ density of 2.7 g $cm^{-3}$ and assuming 50 wt. % the average content of carbonates in the sediments, we can calculate as $1.8\times10^{-3}$ $m^3$ the volume of deep sea sediments affected by the clathrate dissolution. Taking into account the porosity of the sediment (∼70%), the source term would correspond to a sphere of approximately 11.2 m radius, having a pH of 3.9 where all carbonate sediments have dissolved.

The presence of alumino silicates has not been considered here. Thermodynamic data and properties of the heterogeneous $NaCl-CO_2-H_2O$ sediment system at a high pressure and low temperature need to be known, together with information on rate and extent of carbonate-silicate pH-buffering reactions. However, the increased neutralisation capacity is expected to further limit the spatial extent of sediment alterations.

Predicting the temporal and spatial evolution of the penetrator after deployment, requires an estimation of the coupled processes in the system. If a sufficiently small elementary volume is chosen, any part of the system can be regarded as in local internal equilibrium. However, kinetics and irreversibility of reactions may be important in the vicinity of the penetrator, where chemical and thermal gradients are pronounced. A combined equilibrium-kinetic approach is therefore more appropriate. This requires the simultaneous treatment of the forward dissolution rate of clathrate, of the kinetic constraints and solubility limits imposed by dissolution-precipitation of alumino silicates and carbonate minerals, and the hydrological transport processes occuring in the porewater. The carbon dioxide dissolution and transport from a liquid $CO_2$ pond injected on the ocean floor at 3500 m depth has been modelled neglecting any chemical interactions with the sediments. With an oceanic current of 5 cm.sec$^{-1}$, a plume of low pH $H_2CO_3$ enriched seawater has been postulated to move more than 5000 m in four days (Ohsumi et al: Density change of water due to dissolution and near field behaviour of carbon dioxide from a source on deep sea floor. Energy Gonvers.Mgmt. Vol 33, No. 5–8, 685–690, (1992).

Hydrological phenomena in the region surrounding an embedded penetrator, however, will be dominated by very low or diffusion controlled flow conditions, thus reducing the extent of carbon dioxide dispersal by many orders of magnitude. The molecular diffusion coefficient of $CO_2$ in pure water at 5° C. is in the order of $1.10^{-5}$ cm$^2$ sec$^{-1}$. In the presence of ionized solutes, such as NaCl and $MgCl_2$, diffusion is slower due to viscosity effects. Because of the tortuous pathway in the sediment column, the apparent diffusivity would decrease further. Being conservative and neglecting interactions with the surrounding sediment barrier, the dissolved carbon dioxide molecules diffusing out of the near field region would take about $5 \times 10^3$ years to migrate a distance of 10 m. This has been calculated for a deeply buried sediment of porosity of approximately 70% and with a geometric tortuosity factor of 1.43. Water-sediment interactions would retard this diffusional movement even further. As buffering continues, the pH would slowly increase with increasing distance from the source term region. Eventually, solid carbonates would begin to precipitate in the advancing front when the solubility limit is reached.

After emplacement of the penetrator in the sediment floor, a strong thermal gradient will establish between the solid $CO_2$ penetrator (approximately 100° C.) and the surrounding environment (2° C.), until the thermodynamically stable clathrate forms. During this transient phase, thermodiffusional transport will mobilize aqueous components towards the cold zone. This will counteract the movement of reactive solutes away from the carbon dioxide penetrator along the chemical gradient. Changes in the size of the system (the density will decrease from 1.56 Kg.dm$^{-3}$ for solid $CO_2$ to 1.1 Kg.dm$^{-3}$ for the clathrate) and geomechanical properties of marine sediments may also result from these thermal effects.

Sequestrations of power plant carbon dioxide emissions followed by liquefaction and pumping in the deep sea has been investigated.

Problems of transport of carbon dioxide from a power plant to a deep ocean disposal site have also been investigated, including overland and undersea transport (pipelines), and discharge from floating platforms.

Considering only the technical aspect of the disposal option it is, nevertheless, possible to make a very rough estimate of the number of penetrators that might be needed to dispose of waste from a thermal power station, as well as the area of sea floor that would be required for their emplacement. A thermal power (1 GW) station will emit about 3.109 Kg. (i.e 3 million tons) carbon dioxide per year [Haugen, P. M. & Drange, H. Sequestration of carbon dioxide in the deep ocean by shallow injection. Nature, Vol. 357, 318–320 (1992)]. This is equivalent to the volume of three thousand (3000) penetrators of the dimensions described above.

Estimating an emplacement distance between penetrators of, say 20 m, then the disposal of 3000 penetrators would cover about 1.1 Km$^2$, a negligible surface of the sea floor given that ocean areas, at depths of greater than 3000 m (abyssal plains or trenches) having soft clay or carbonate rich sediments, amount to many millions of square kilometres. The above calculation only considers the emissions from one power station, however, it is possible to make some very preliminary estimates for global thermal electrical production and compare the quantities to the natural carbon cycle fluxes.

Economic projections predict a doubling of the carbon dioxide in the atmosphere by the year 2050, and that man's present activities annually inject 20 Gt of carbon dioxide i.e. 5.5 Gt carbon, into the atmosphere [Intergovernmental Panel on Climate Change (IPCC). Climate Change—the IPCC Assessment (Houghton, J. T., Jenkins, G. T., and Ephraums, J. J., eds) Cambridge University Press, Cambridge, England, (1990)]. Under present conditions, approximately 57% of the total yearly emissions remains in the atmosphere. Thus of this total global emission some 3.2 Gt-C remain in the atmosphere (0.4–0.5% annual increase). The remaining 2.3 Gt-C must thus be absorbed by the natural environment (ocean-land biosphere), however, the sink of this annual flux has not yet been clearly identified.

It has, however, been estimated [Herzog H., Golomb, D., and Zemba, S. Feasibility, modelling and economics of sequestering power plant carbon dioxide emissions in the deep ocean. Environmental Progress, Vol 10, No. 1, 64–74, (1991)] that fossil-fuelled power plants contribute about one-third of the world's carbon dioxide emissions from fossil fuel sources. Thus power plant production accounts for about 1.8 Gt-C or some 6.5 Gt carbon dioxide.

The oceans represent one of the major sinks of carbon dioxide and contain some fifty times that of the atmosphere. In comparison with terrestrial plants which contain some 550 Gt-C (Giga tons-carbon), oceanic biomass contains only about 3 Gt-C. However, this large difference is offset by the much higher productivity of the plankton. As a consequence carbon dioxide fixation through photosynthesis is carried out at nearly similar rates, some 50–60 Gt-C per year on land and 30–40 Gt-C in the marine environment. The absorption of carbon dioxide is offset, however, by plankton respiration which rapidly re-injects a part of the carbon dioxide back into the atmosphere. Exportation of some of the fixed carbon to deep underlying waters and eventually to the sediments occurs on the death of phytoplankton, called the biological pump (1GT-C per year).

Figure 10:
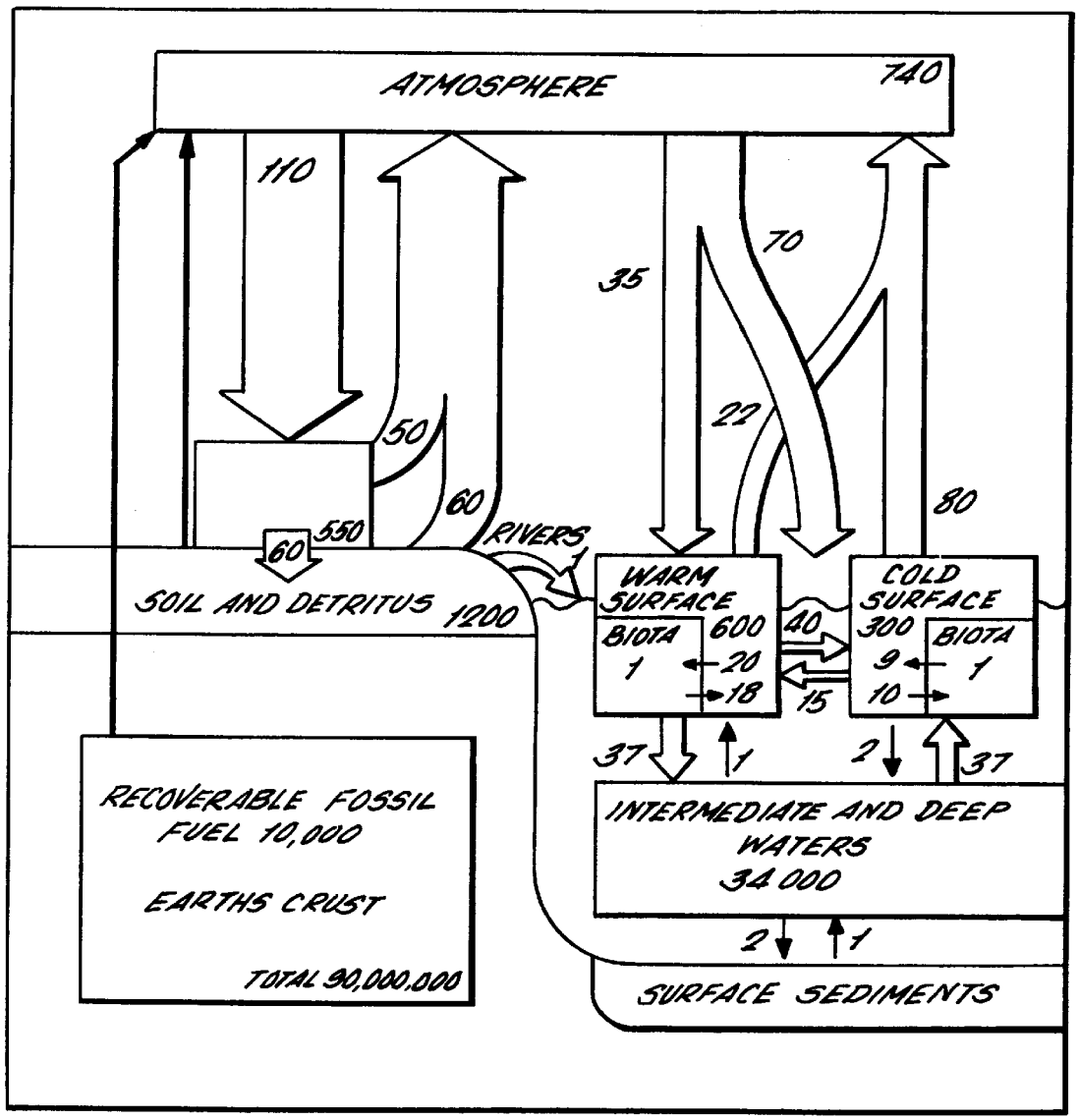
FIG. 10 is a schematic representation of the global carbon cycle.

FIG. 10 shows schematically the main sources and sinks (reservoirs) involved in the global carbon cycle. Although deep ocean waters are an important reservoir for carbon, it is easy to see that they are rather small compared to the underlying stable sedimentary formations and that the disposal volumes would be approximately the same as natural processes (1GT-C or approximately 4 Gt carbon dioxide).

If power plant atmosphere emissions (6.5 Gt carbon dioxide per year) were thus to be entirely disposed of using the deep ocean geological formations, the number of penetrators (1000 tons) would clearly be impressive, amounting to 6.5 million per year. Taking a 330,000 ton super tanker, then approximately some eighteen thousand ship transfers a year, or around fifty a day, would be needed to transport the carbon dioxide for disposal. This figure should, however, be considered in the context of some similar industrial process that occurs already every day, such as for example, worldwide petroleum and natural gas transport by tankers.

Assuming that there are, for the sake of argument, ten primary national petroleum and natural gases producers, who export via sea to their nearest major markets, and that average return transit times are 18 days (i.e. 20 return trips per year), then the number of ships needed per producing country is about ninety to satisfy the world market. Clearly much more work needs to be done to refine these estimates, but the numbers may not be so exaggerated compared to industrial shipping today. It might even be possible to develop a dual cargo system, i.e transporting oil out and carbon dioxide back, via ocean disposal site, on an agreed polluter payer basis between the producer nation and end-user nation thus decrease further the tonnage required.

Thus on a global basis using the penetrator numbers and disposal distance between penetrators estimated above, a single disposal site would cover a seabed zone of approximately 50 km by 50 km, a very small area indeed. If one or more disposal sites were to be envisaged so as to be closer to main markets, then the individual areas could be smaller.

The present invention is hereinafter further described by the following non-limiting example:

EXAMPLE 1
Penetrator Specification

Penetrator length to diameter~10:1,

Penetrator length~44. m

Penetrator Diameter~4.4 m

Penetrator volume~669 cubic meters.

The specific gravity of carbon dioxide in the solid phase at ~−79 C is 1.56. Thus a penetrator of the above dimensions constructed out of solid carbon dioxide weighs ~10 E+6 kg., ie. 1000 tons. The penetrator is produced at a temperature of −100° C.

EXAMPLE 2
Hollow Penetrator Specifications

The volume of water/seawater that must be frozen to form hollow penetrators to surround solid carbon dioxide penetrators of given dimensions is described below. The wall thickness of the ice-water penetrator will depend on the depth of the chosen disposal site and the thermal dissolution rate. At a disposal depth of 4000 m, a free-fall time of 75 seconds and a dissolution rate of 0.7 mm.sec$^{-1}$, then complete insulation is obtained with an ice-water thickness of between 4 to 5 cm.

| Penetrator | | Volume of Water-ice |
|---|---|---|
| Internal Volume ($m^3$) | Weight (t) | of Surrounding Layer ($m^3$) |
| 669 | 1000 | 24–29 (or 25–29 tons) |
| 66.9 | 100 | 6.28 |
| 6.69 | 10 | 0.29 |

The volume of water-ice of surrounding layer leads to an average density decrease of between only 0.3 to 5% and does not markedly effect the depth of penetration into the sea floor sediment.

It will be readily apparent from the description given that deep ocean disposal by a similar method might be feasible for other gaseous, liquid or even solid waste products provided that they could be moulded or prepared in the correct hydrodynamic shape and density for embedment into the sedimentary floor and their composition was such that by chemical interaction with the sediment they would be permanently sequested on the ocean floor. Candidates for disposal by this means might be other carbon or nitrogen based gases (e.g. methane) and even contaminated water. The present invention also relates to the preparation of materials with the same Newtonian fluid characteristics of air and water into a hydrodynamic shape for expulsion from the earth and the earth's atmosphere or introduction to other planetary bodies.

What is claimed is:

1. A process for the disposal of gaseous carbon dioxide comprising the steps of:

Solidifying carbon dioxide; and embedding the solid carbon dioxide in open water floor sediment, wherein the depth and temperature of the open water floor sediment are such that the solid carbon dioxide can transform to a clathrate.

2. A process as claimed in claim 1 wherein the open water is sea.

3. A process as claimed in claim 2 wherein the sea floor sediment is a sedimentary carbonate formation at a depth less than the carbonate compensation depth of around 4 km.

4. A process as claimed in claim 2 wherein the sea floor sediment is a clay-type sediment at about 4 km or deeper.

5. A process as claimed in claim 1 wherein the solid carbon dioxide is solidified into a hydrodynamic/streamlined shape.

6. A process as claimed in claim 5 wherein the solid carbon dioxide is solidified into a torpedo shape.

7. A process as claimed in claim 5 wherein during solidification of the carbon dioxide shavings or cladding of some dense metal are added to the carbon dioxide.

8. A process as claimed in claim 1 wherein the carbon dioxide is solidified inside a frozen liquid mould.

9. A process as claimed in claim 8 wherein the frozen liquid is ice-water.

10. A process as claimed in claim 1 wherein the solidified carbon dioxide is filled into a frozen liquid mould.

11. A process as claimed in claim 1 wherein the solidified carbon dioxide is substantially surrounded by a layer of frozen liquid.

* * * * *